United States Patent
Chen

(10) Patent No.: US 8,175,200 B2
(45) Date of Patent: May 8, 2012

(54) HYBRID CORRELATION AND LEAST SQUARES CHANNEL ESTIMATION

(75) Inventor: Dayong Chen, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 383 days.

(21) Appl. No.: 12/641,450

(22) Filed: Dec. 18, 2009

(65) Prior Publication Data

US 2011/0150154 A1   Jun. 23, 2011

(51) Int. Cl.
| | |
|---|---|
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ........ 375/346; 375/350; 375/231; 375/232; 375/233; 375/285; 455/63.1; 455/296; 455/307

(58) Field of Classification Search .................. 375/346, 375/350, 230–233, 284, 285; 455/63.1, 296, 455/307
See application file for complete search history.

(56) References Cited

U.S. PATENT DOCUMENTS

| | | | | |
|---|---|---|---|---|
| 5,579,344 | A  * | 11/1996 | Namekata | 375/341 |
| 5,805,638 | A  * | 9/1998 | Liew | 375/231 |
| 6,275,525 | B1 * | 8/2001 | Bahai et al. | 375/232 |
| 6,674,820 | B1 | 1/2004 | Hui et al. | |
| 2004/0266383 | A1 | 12/2004 | Mattellini et al. | |
| 2005/0078777 | A1 | 4/2005 | He | |
| 2005/0079826 | A1 | 4/2005 | He | |
| 2005/0250466 | A1 | 11/2005 | Varma et al. | |
| 2005/0259770 | A1* | 11/2005 | Chen | 375/346 |

FOREIGN PATENT DOCUMENTS

EP    1 956 718 A1    8/2008

* cited by examiner

*Primary Examiner* — Phuong Phu

(57) ABSTRACT

A hybrid channel estimator for a wireless communication system receiver includes both correlation based and least squares based channel estimators. The correlation estimator is used when signal quality is low or noise is colored. The least squares estimator is used when signal quality is high or noise is white. An interference suppression filter improves signal quality by suppressing interference in a received signal. Generally, correlation channel estimation is performed initially, when signal quality is low and noise is colored, and interference suppression filtering is performed to increase signal quality by removing certain portion of interference and whitening the overall impairment spectrum. These may be done iteratively. When the signal quality improves, least squares channel estimation is performed, which may also be iterative. The training sequence and noise may be whitened prior to performing least squares channel estimation, which is the final operation before channel estimates are forwarded to a demodulator.

18 Claims, 3 Drawing Sheets

HYBRID CORRELATION AND LEAST SQUARES CHANNEL ESTIMATION

FIELD OF THE INVENTION

The present invention relates generally to wireless communication networks, and in particular to a system and method of channel estimation utilizing both correlation and least squares computational approaches.

BACKGROUND

Wireless communication systems modulate data onto electromagnetic carriers, and transmit the data from one or more transmit antennas, across an air interface, to one or more receiver antennas. Processing circuits and software at the receiver then attempt to recover the data from the received signal, which includes the data, interference, and noise. By estimating and suppressing interference and noise, the data may be recovered more accurately. Interference cancellation is thus a ubiquitous feature of wireless communication systems radio receivers, both in fixed network transmission sites (variously known as base stations, Node B, or Access Points) and mobile User Equipment (UE, also known as mobile stations). To accurately estimate (and hence cancel) interference, estimates of the channel must first be formulated which is well modeled as a time varying FIR filter with L+1 taps. Channel estimation in an interference cancellation receiver is a challenging task due to possibly very low operating carrier to interference ratio (C/I).

Two known approaches to channel estimation (both explored more fully herein) are correlation based channel estimation, and least squares based channel estimation. Correlation channel estimation correlates a known training sequence in the received signal to its known values, multiplying with the complex conjugate at different offsets and the correlation peak values are the channel estimates. Least squares channel estimation minimizes the sum of the squared error quantities of the difference between the received signal and the predicted signal which is the known training sequence symbols passing through the FIR filter.

A channel estimator can be characterized as either biased or unbiased. An estimator is biased if its statistical expected value is not equal to the true value being estimated. The estimator is unbiased if its expected value is the true value being estimated. In addition to its mathematical structure, whether an estimator is biased or unbiased also depends on the statistics of channel impairment, which includes white noise and interference. An impairment is referred to as "white" if it has a substantially uniform spectral power density—that is, it exhibits a flat frequency spectrum, with equal power in any bandwidth. Conversely, impairment is referred to as "colored" if it has a non-uniform spectral power density. If impairment is white, the least squares channel estimate is unbiased whereas the correlation channel estimate is biased.

To cancel interference, a receiver must also estimate a spatial-temporal whitening filter. There are two different approaches. In Spatial-Temporal Interference Rejection Combining (ST-IRC) and indirect Generalized Least Squares (iGLS), the radio channel and the whitening filter are estimated jointly. Alternatively, in iterative channel estimation, the channel is estimated first, and the channel estimates are then used to estimate the whitening filter.

Joint channel estimation has better performance than iterative channel estimation since interference cancellation is part of the channel estimation. The drawback is the high computational complexity. In joint estimation, many parameters are estimated simultaneously, which requires the inversion of large matrices. This is computationally difficult to implement using available processors, such as 16-bit fixed-point DSP devices.

In contrast, iterative channel estimation is much less computationally demanding, and hence can more easily and inexpensively be implemented. In iterative channel estimation, only small matrices need to be inverted, e.g., a 2×2 compared to a 13×13 matrix for iGLS. However, since the initial channel estimation is done without interference cancellation, the receiver must re-estimate the channel after the interference cancellation or whitening.

Due to the low complexity and numerical stability, iterative channel estimation is used in both network base stations and mobile UEs. Both solutions use spatial-temporal whitening for interference cancellation using the Whittle-Wiggins-Robinson Algorithm (WWRA). In many cases, the iterative channel estimation in UE is correlation based, as this method yields better performance in low C/I conditions. At high C/I, the correlation channel estimate is biased, which causes an irreducible bit error floor. Without error correction coding, data throughput will drop significantly due to increased packet retransmission. The iterative channel estimation in base stations is often least squared based, which yields better performance with high C/I. If C/I is low and the impairment is dominated by a few strong interferers (i.e., colored impairment), the least squares channel estimate performs much worse than the correlation channel estimate due to the distortion caused by the factor $(S^H S)^{-1}$ where S is the convolution matrix built from known training sequence symbols. Thus, neither technique is optimal under all conditions; however, wireless communication system receivers (whether deployed at the base station or in UE) must accurately receive data, and hence perform accurate channel estimation, under all channel conditions.

SUMMARY

According to embodiments of the present invention disclosed and claimed herein, a hybrid channel estimator for a wireless communication system receiver includes both a correlation based channel estimator and a least squares based channel estimator. The correlation based channel estimator is used when signal quality is low or noise is colored. The least squares based channel estimator is used when signal quality is high or noise is white. Between the correlation and least squares based channel estimator, an interference suppression filter improves signal quality by suppressing interference in a received signal. Generally, correlation based channel estimation is performed initially, when signal quality is low, and interference suppression filtering is performed to increase signal quality. These may be done in a number of iterations until the signal quality is improved beyond a predetermined level, when the least squares based channel estimation can be advantageously performed. If necessary, the training sequence and noise may be whitened prior to performing least squares based channel estimation, which is the final operation before channel estimates are forwarded to a demodulator for coherent demodulation.

One embodiment relates to a method of hybrid channel estimation in a wireless communication receiver. A wirelessly transmitted signal including a training sequence is received. A correlation channel estimate is performed on the received signal to generate correlation based channel estimates. The initial channel estimate is used to estimate a whitening filter which can be optionally applied to the received signal to improve the signal quality. But before actually applying the whitening filter to the received signal, one or more noise metrics of the original and filtered signals are assessed over the known training sequence. By analyzing and comparing the noise metrics of the original and filtered signal, a decision is made whether or not the received signal shall be whitened. In either case, the original or filtered signal is passed to the least squares based channel estimator for generating final channel estimates.

Another embodiment relates to a hybrid channel estimator for a wireless communication receiver. The estimator receives baseband samples of a received signal including noise and interference, and outputs channel estimates. The hybrid channel estimator includes a correlation based channel estimator, a least squares based channel estimator, and a control function. The control function is operative to estimate signal quality and noise color. The control function is operative to select the correlation based channel estimator if signal quality is below a predetermined threshold or noise is colored, and to select the least squares based channel estimator if signal quality is above a predetermined threshold or noise is white.

DETAILED DESCRIPTION

Correlation channel estimation is based on cross-correlations $C(j)$ between the complex-valued receive signal $x(n)$ and the known training sequence symbols $t(k)$, $k=0, 1, \ldots N-1$ where j is a sample index in a search window and N is the number of training symbols.

$$C(j) = \frac{1}{N} \sum_{k=0}^{N-1} x(j+k) t^H(k)$$

The L+1 complex-valued channel taps corresponding to sync position j are $$h_j(k) = C(j+k), k=0,1,2,\ldots,L.$$

In the least squares channel estimation algorithm, the L+1 complex-valued channel taps for sync position j are $$h = (S^H S)^{-1} S^H x$$

where $h(j) = [h(0), h(1), \ldots h(L+1)]^T$, $x = [x(j+L), \ldots x(j+N-1)]^T$ and $$S = \begin{bmatrix} t(L) & \ldots & t(0) \\ \ldots & \ldots & \ldots \\ t(N-1) & \ldots & t(N-1-L) \end{bmatrix}.$$

In whitening filter estimation using WWRA, the received signal $x(n)$ is split into In-phase (I) and Quadrature phase (Q) components $x(n) \to r(n) = [x_i(n) x_q(n)]^T$. Given L+1 channel taps, the impairment on the I & Q branches $v(n) = [v_i(n) v_q(n)]^T$ can be estimated and its auto-correlation matrices at lags 0-K $P(0), P(1), \ldots P(K)$ are calculated. The impairment is modeled as a vector auto-regressive (VAR) process of order K from which the Yule-Walker equation is derived and solved using the efficient WWRA algorithm to obtain the filter B. Note that B(k) are either 4×4 or 2×2 real matrices depending on whether the receive signal is 2× over-sampled.

$$B = [B(0), B(1) \ldots B(K)]$$

The whitening filter estimation also yields the residual impairment covariance matrix $Q = E\{v(n)v^T(n)\}$ which can be used, according to embodiments described herein, to determine if the signal should be whitened in each stage. The signal whitening is done by convolving B with the receive signal $r(n)$.

$$r_w(n) = \sum_{k=0}^{K} B[k] r(n-k)$$

Figure 1:
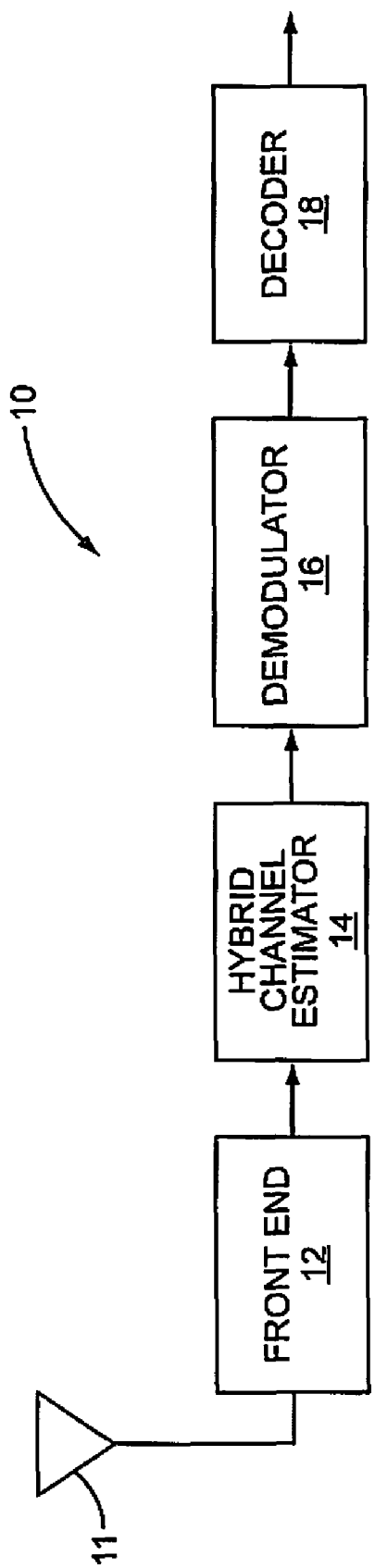
FIG. 1 is a functional block diagram of portions of a wireless communication receiver.

FIG. 1 depicts the relevant portion of a wireless communication receiver 10, which may be deployed in a base station or UE. In either case, the receiver 10 includes many additional functional modules not depicted in FIG. 1 for clarity. The receiver 10 receives radio signals at one or more antennas 11, which are processed in a receiver chain comprising a front end circuit 12, a hybrid channel estimator of 14, a demodulator 16, and a channel decoder 18. In the radio front end circuit 12, the received signal is low-noise amplified, down-converted to baseband, digitized, and filtered to symbol- or half-symbol spaced samples which are used as input to the hybrid channel estimator 14. The hybrid channel estimator 14, as disclosed more fully herein, employs both correlation based and least squares based channel estimation techniques, in response to noise properties of the received signal, to most efficiently and accurately generate the channel estimates. The demodulator 16 estimates soft values for the transmitted bits, which in turn are used for channel decoding by the decoder 18. Although depicted in a single chain associated with a single antenna 11, the hybrid channel estimator 14 is applicable in multi-antenna receivers 10 with multiple radio front end circuits 12 producing multiple complex-valued received signals.

Figure 2:
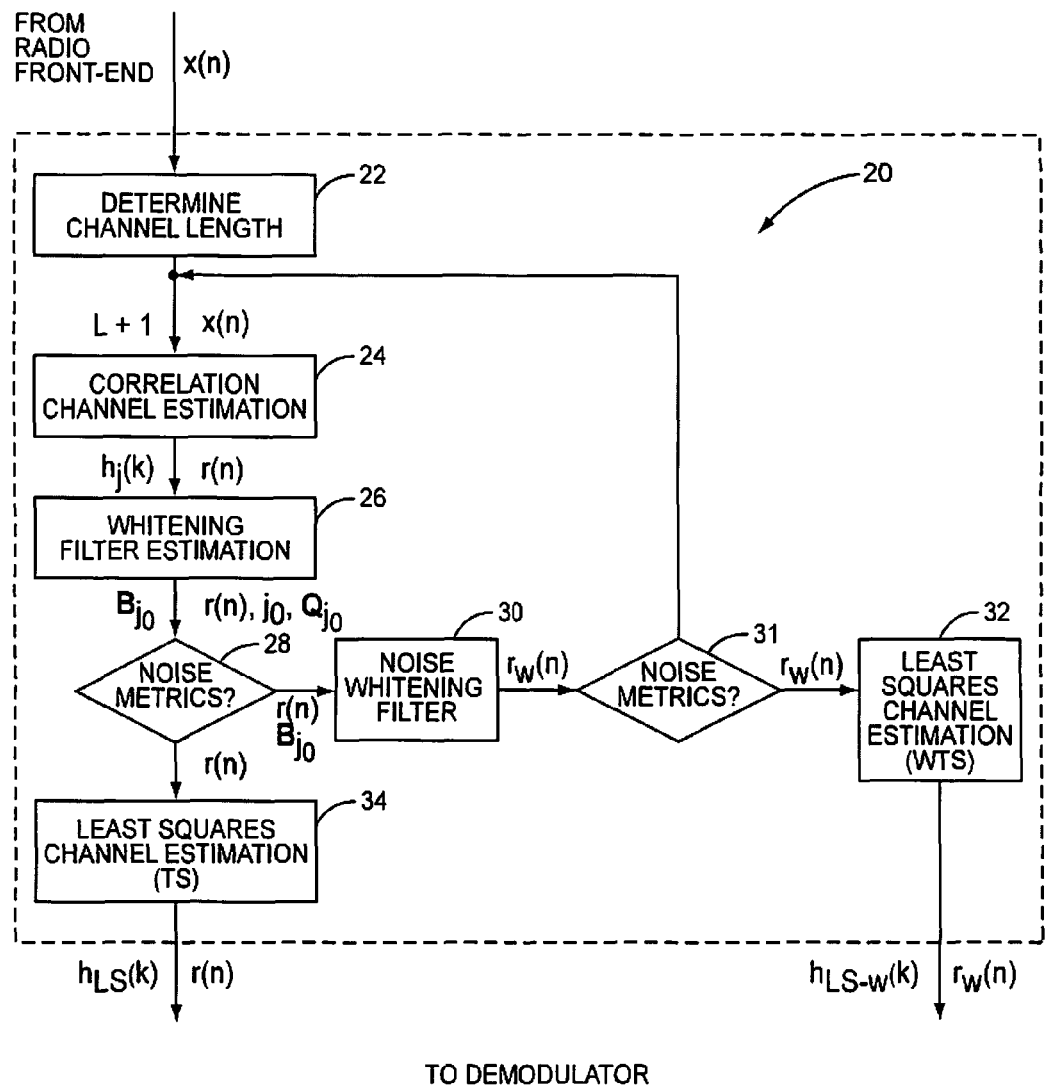
FIG. 2 is a flow diagram of a hybrid method of channel estimation.

A method 20 of hybrid channel estimation performed by the hybrid channel estimator 14 is depicted in FIG. 2. The hybrid channel estimator 14 receives the complex signal $x(n)$ from the radio front end circuit 12. The number of channel taps to be estimated L+1 is determined (block 22) by calculating cross-correlations between received signal and know training sequence with different hypothesis of L, comparing the correlation energies, and selecting the L+1 with the larger energy. The correlation-based channel taps for each sync position j in the search window $h_j(k)$, $k=0, 1, 2, \ldots, L$ are estimated (block 24). For each sync position j, a spatial-temporal whitening filter $B_j = [B_j(0) B_j(1) \ldots B_j(K)]$ and residual impairment covariance matrix $Q_j$ are estimated (block 26) using the channel taps $h_j(k)$, $k=0, 1, 2, \ldots, L$ estimated in block 24. The synchronization position $j_0$ is determined by finding the sync position with the minimum determinant value of impairment covariance matrix $$j_0 = \arg \min_j Q_j.$$

Noise metrics are then assessed to determine whether to whiten the signal. In one embodiment, if $\det(Q_{j_0}) < \lambda \{\text{tr}(P_{j_0}(0))\}^2$ where $\lambda$ is a pre-defined threshold, and $\det(Q_{j_0})$ and $\text{tr}(P_{j_0}(0))$ are the determinant and trace of $Q_{j_0}$ and $P_{j_0}$, respectively (block 28), then whitening is performed (block 30). The value of $\lambda$ is chosen to get the best trade-off between the interference cancellation and receiver sensitivity. The received signal r(n) is convolved with the whitening filter $B_{j_0} = [B_{j_0}(0) B_{j_0}(1) \ldots B_{j_0}(K)]$ $$r_w(n) = \sum_{k=0}^{K} B[k] r(n-k).$$

The whitening filter $B_{j_0} = [B_{j_0}(0) B_{j_0}(1) \ldots B_{j_0}(K)]$ is then convolved with the original training sequence to obtain a whitened training sequence $P_i$ which is used in the subsequent least squares channel estimator (block 32) in the case that it is determined whitening is needed (block 28). By using whitened instead of the original training sequence, the channel estimation noise can be reduced.

$$P_t = \sum_{k=0}^{K} t_{t+1-k} B_{j_0}(k).$$

If the whitened signal $r_w(n)$ exhibits sufficient signal quality (e.g., C/I) and the noise spectrum is sufficiently whitened (block 31), a least squares estimation is performed (block 32). Otherwise, another pass through the correlation channel estimator (block 24) and whitening filter (block 26) is performed. The received signal may be iteratively processed by the correlation channel estimator and whitening filter multiple times, until the least squares based channel estimation can be advantageously applied or the maximum number of executions has been reached.

A least squares channel estimate $h_{LS-w}$ is calculated using the whitened training sequence $h_{LS-w} = (W^H W)^{-1} W^H y$ (block 32), where $$W = \begin{bmatrix} P_L & P_{L-1} & \ldots & P_0 \\ P_{L+1} & P_L & \ldots & P_1 \\ \ldots & \ldots & \ldots & \ldots \\ P_{N-2} & P_{N-3} & \ldots & P_{N-K-L} \end{bmatrix},$$

$$y = \begin{bmatrix} x_I(j_0 + L + K) \\ x_Q(j_0 + L + K) \\ \ldots \\ x_I(j_0 + N - 1) \\ x_Q(j_0 + N - 1) \end{bmatrix}, \text{ and}$$

$$h_{LS-w} = \begin{bmatrix} h_I(0) \\ h_Q(0) \\ \ldots \\ h_I(L) \\ h_Q(L) \end{bmatrix}.$$

In one embodiment, the whitened signal $r_w(n)$ and channel estimates $h_{LS-w}$ are forwarded to the demodulator 16. In another embodiment, the least squares channel estimation (block 32) may be iteratively performed until signal quality and/or noise spectrum meet predetermined thresholds (this iteration not depicted in FIG. 2).

If the noise metrics at block 28 indicate that further whitening is not required, the least squares channel estimate $h_{LS}$ are calculated using the original training sequence, $$h_{LS} = (S^H S)^{-1} S^H x \quad \text{(block 36)}.$$

The original received signal r(n) and channel estimates $h_{LS}$ are forwarded to the demodulator 16. Thus, the least squares channel estimation process based on the original training sequence (block 36) is performed only once.

In some embodiments, the noise metrics considered at block 28 may comprise measures of noise power or signal quality, such as the Signal to Noise and Interference Ratio (SNIR) or Carrier to Interference ratio (C/I). For example, a low C/I would direct flow from block 28 to block 30, whereas a high C/I would direct flow to block 34. In other embodiments, such as the one described above, assessing the noise metrics at block 28 may comprise determining whether the noise is white or colored, such as inspecting the value of off-diagonal elements of an impairment covariance matrix. White noise would direct flow from block 28 to block 34 whereas colored noise would direct flow to block 30. In other embodiments, a combination of noise power and noise color may be used. In general, those of skill in the art may readily implement decision variables appropriate for particular implementations, given the teachings of the present disclosure.

Although FIG. 2 depicts only one "pass" through the hybrid channel estimator 14, those of skill in the art will recognize that, e.g., the correlation-based channel estimation and interference suppression filtering (i.e., blocks 24-26) maybe iteratively performed two or more times, to successively improve signal quality by suppressing interference, prior to assessing noise color to select the type of least squares channel estimation to employ. Similarly, the least squares channel estimation can also be performed a number of times to suppress more interference depending on the noise metrics calculated in the decision function. Note the decision function is in general performed several times, but the decision to switch to the least squares channel estimation from correlation channel estimation is a critical one with regard to receiver performance.

Figure 3:
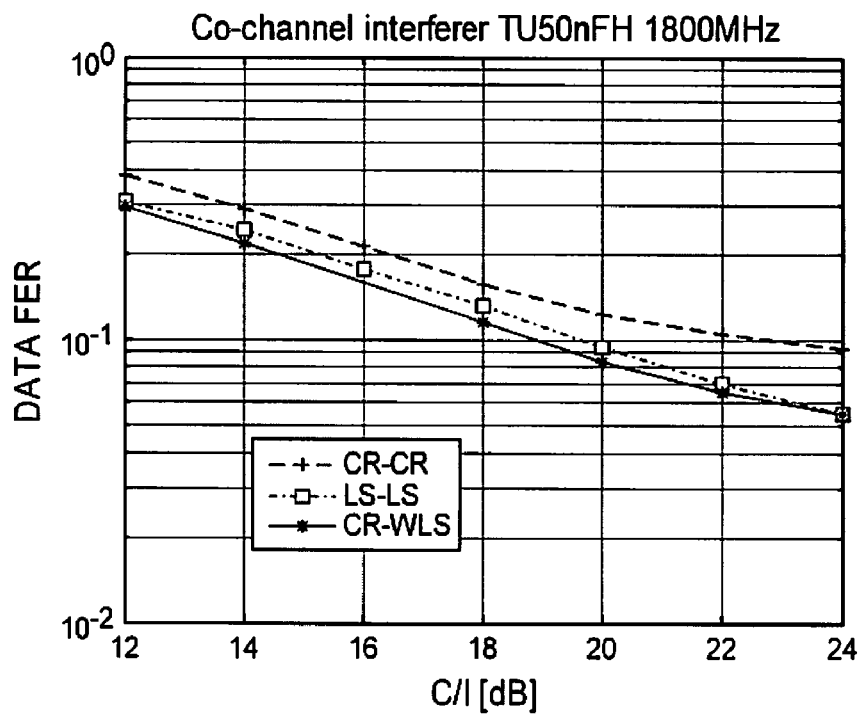
FIGS. 3 and 4 are graphs depicting performance simulations of the receiver of FIG. 1.

Simulation results show that the hybrid channel estimator 14 can significantly improve receiver performance both at low and high C/I. FIG. 3 depicts the frame error rate (FER) performance for CS4 used in GPRS. It can be seen that at the high C/I (e.g., 20 dB or higher), using the correlation channel estimation in both stages (CR-CR) has the worst performance due to the channel estimation bias. Using the least squares channel estimation in both stages (LS-LS) is more than 2 dB better than CR-CR at 10% FER. However, the hybrid method 20 of using the correlation channel estimation in the first stage and the least squares channel estimation in the second stage (CR-WLS) has the best performance; it is 3.5 dB better than correlation alone and 0.5 dB better than least squares alone.

Figure 4:
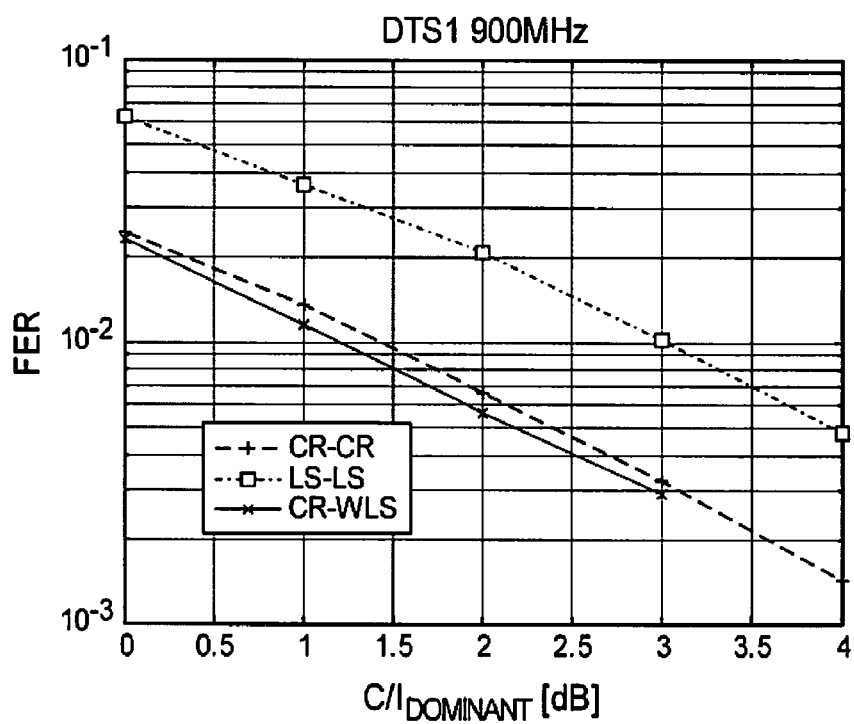

FIG. 4 depicts the FER of a GSM full-rate speech (FS) channel which operates at very low C/I of around 1.0 dB. It can be seen that using only least squares channel estimation (LS-LS) has the worst performance due to least squares channel estimation distortion at low C/I. The correlation based method in both stages (CR-CR) is 1.5 dB better than least squares alone. Here again, the hybrid method 20 of using the correlation channel estimation in the first stage and the least squares channel estimation in the second stage (CR-WLS) has the best performance; it is 1.8 dB better than least squares alone and 0.3 dB better than correlation alone. Other simulations over a variety of logical channels, C/I ranges, and fading channel profiles have also verified improved performance of the hybrid method 20 as compared to the prior art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of hybrid channel estimation in a wireless communication receiver, comprising:
   receiving a wirelessly transmitted signal including a training sequence;
   performing a correlation channel estimate on the received signal to generate correlation based channel estimates;
   filtering the received signal based on the correlation based channel estimates to generate a filtered signal;
   assessing one or more noise metrics of the filtered signal;
   in response to a noise metric, optionally performing noise whitening filtering on the filtered signal; and
   performing a least squares based channel estimate on the filtered signal to generate final channel estimates.

2. The method of claim 1 wherein, if noise whitening filtering is not performed on the received signal, the least squares based channel estimate is performed using the original training sequence and the original received signal.

3. The method of claim 1 wherein, if noise whitening filtering is performed on the received signal, the least squares based channel estimate is performed using a whitened training sequence and whitened received signal.

4. The method of claim 1 wherein filtering the received signal comprises performing interference cancellation on the received signal.

5. The method of claim 1 wherein performing a correlation based channel estimate on the received signal comprises correlating a training sequence in the received signal with known values.

6. The method of claim 1 wherein assessing one or more noise metrics of the filtered signal comprises comparing one or more noise metrics of the filtered signal to one or more corresponding predetermined threshold values.

7. The method of claim 1 wherein the noise metric comprises a carrier to interference ratio (C/I).

8. The method of claim 1 wherein the noise metric comprises a signal to noise and interference ratio (SNIR).

9. The method of claim 1 wherein the noise metric comprises a measure of the spectrum correlation of the noise.

10. The method of claim 1 further comprising, in response to a noise metric, iterating the correlation based channel estimate and filtering steps.

11. The method of claim 1 further comprising, in response to a noise metric, iterating the noise whitening filtering and least squares based channel estimate steps.

12. A hybrid channel estimator for a wireless communication receiver, the estimator receiving baseband samples of a received signal including noise and interference, and outputting channel estimates, the hybrid channel estimator comprising:
   a correlation based channel estimator;
   a least squares based channel estimator; and
   a control function operative to estimate signal quality and noise color, and operative to select the correlation based channel estimator if signal quality is below a predetermined threshold or noise is colored, and operative to select the least squares based channel estimator if signal quality is above a predetermined threshold or noise is white.

13. The channel estimator of claim 12 further comprising an interference suppression filter, and wherein the control function is further operative to select the interference suppression filter to improve signal quality.

14. The channel estimator of claim 13 wherein the controller is further operative to iteratively select the correlation based channel estimator and interference suppression filter to successively improve signal quality, and to then select the least squared based channel estimator when the signal quality exceeds a predetermined threshold.

15. The channel estimator of claim 12 wherein the controller is further operative to iteratively select the least squares based channel estimator in response to noise color.

16. The channel estimator of claim 12 wherein the signal quality is the signal to noise and interference ratio (SNIR).

17. The channel estimator of claim 12 wherein the signal quality is the signal carrier to interference ratio (C/I).

18. The channel estimator of claim 12 wherein the control function estimates noise color by inspecting and comparing off-diagonal and diagonal elements of an impairment covariance matrix.

* * * * *